US012633218B2

(12) United States Patent
Frederick et al.

(10) Patent No.: US 12,633,218 B2
(45) Date of Patent: May 19, 2026

(54) MAGNETIC VECTOR DYNAMICS FOR MANAGING VEHICLE MOVEMENTS

(71) Applicant: Frederick Energy Products, LLC, Huntsville, AL (US)

(72) Inventors: Larry D. Frederick, Huntsville, AL (US); Dean Estill, Huntsville, AL (US); Andrew Nichols, Huntsville, AL (US)

(73) Assignee: Frederick Energy Products, LLC, Huntsville, AL (US)

( * ) Notice: Subject to any disclaimer, the term of this patent is extended or adjusted under 35 U.S.C. 154(b) by 214 days.

(21) Appl. No.: 18/448,415

(22) Filed: Aug. 11, 2023

(65) Prior Publication Data

US 2023/0386341 A1 Nov. 30, 2023

Related U.S. Application Data

(63) Continuation of application No. PCT/US2022/016226, filed on Feb. 11, 2022.

(60) Provisional application No. 63/200,088, filed on Feb. 12, 2021.

(51) Int. Cl.
| | |
|---|---|
| *G08G 1/16* | (2006.01) |
| *B66F 9/075* | (2006.01) |
| *B66F 17/00* | (2006.01) |
| *G01V 3/08* | (2006.01) |
| *G08G 1/042* | (2006.01) |

(52) U.S. Cl.
CPC .......... *G08G 1/166* (2013.01); *B66F 9/0755* (2013.01); *G01V 3/081* (2013.01); *G08G 1/042* (2013.01); *G08G 1/165* (2013.01); *B66F 17/003* (2013.01)

(58) Field of Classification Search
CPC ........ G08G 1/166; G08G 1/042; G08G 1/165; B66F 9/0755; B66F 17/003; B66F 9/24; G01V 3/081; G01V 3/08
See application file for complete search history.

(56) References Cited

U.S. PATENT DOCUMENTS

| | | | | |
|---|---|---|---|---|
| 4,658,214 | A | 4/1987 | Petersen | |
| 7,149,627 | B2 * | 12/2006 | Ockerse | G01C 17/38 |
| | | | | 702/92 |
| 7,420,471 | B2 | 9/2008 | Frederick et al. | |
| 7,427,929 | B2 * | 9/2008 | Bauer | G08G 1/162 |
| | | | | 340/471 |
| 8,169,335 | B2 | 5/2012 | Frederick et al. | |
| 8,232,888 | B2 * | 7/2012 | Frederick | B60Q 9/008 |
| | | | | 119/721 |
| 8,446,277 | B2 | 5/2013 | Frederick | |
| 8,463,569 | B2 * | 6/2013 | Cain | G01C 17/02 |
| | | | | 702/92 |
| 8,552,882 | B2 | 10/2013 | Frederick et al. | |
| 8,710,979 | B2 | 4/2014 | Frederick | |
| 8,810,390 | B2 | 8/2014 | Frederick | |
| 8,847,780 | B2 | 9/2014 | Frederick et al. | |

(Continued)

OTHER PUBLICATIONS

International Search Report for PCT/US2022/016226, dated May 3, 2022 (3 pages).

*Primary Examiner* — Quan Zhen Wang
*Assistant Examiner* — Mancil Littlejohn, Jr.
(74) *Attorney, Agent, or Firm* — Merchant & Gould P.C.

(57) ABSTRACT

A proximity detection and collision avoidance system determines whether a collision risk exists between two vehicles by measuring magnetic field vectors generated on each of the vehicles as the relative distance between the vehicles decreases.

20 Claims, 9 Drawing Sheets

(56)  References Cited

U.S. PATENT DOCUMENTS

| | | |
|---|---|---|
| 9,788,151 B2 | 10/2017 | Duan et al. |
| 9,822,927 B2 | 11/2017 | Frederick |
| 10,200,886 B2 | 2/2019 | Duan et al. |
| 10,444,321 B2 | 10/2019 | Pu et al. |
| 10,591,627 B2 | 3/2020 | Frederick et al. |
| 11,259,143 B2 | 2/2022 | Duan et al. |
| 11,259,144 B2 | 2/2022 | Duan et al. |
| 11,470,448 B2 | 10/2022 | Ye et al. |
| 11,519,999 B2 | 12/2022 | Rybalko et al. |
| 11,619,703 B2 | 4/2023 | Duan et al. |
| 11,624,801 B2 | 4/2023 | Ye et al. |
| 11,638,187 B2 | 4/2023 | Ye et al. |
| 11,682,305 B2 | 6/2023 | Ye et al. |
| 11,762,056 B2 | 9/2023 | Ye et al. |
| 11,812,328 B2 | 11/2023 | Ye et al. |
| 2009/0109049 A1 | 4/2009 | Frederick et al. |
| 2015/0156746 A1 | 6/2015 | Horne et al. |
| 2015/0311649 A1 | 10/2015 | Horne et al. |
| 2015/0317897 A1* | 11/2015 | Frederick ............... G08B 21/22 |
| | | 340/686.6 |
| 2016/0334212 A1* | 11/2016 | Favilla ..................... G01D 5/16 |
| 2017/0090568 A1 | 3/2017 | Chen et al. |
| 2018/0027600 A1 | 1/2018 | Lawlis et al. |
| 2018/0087927 A1* | 3/2018 | Anagawa ........... G01D 5/24485 |
| 2020/0209422 A1 | 7/2020 | Frederick et al. |
| 2022/0272488 A1 | 8/2022 | Pekhteryev et al. |
| 2022/0377752 A1 | 11/2022 | Zhbankov et al. |
| 2022/0390586 A1 | 12/2022 | Ye |
| 2023/0067130 A1 | 3/2023 | Duan et al. |
| 2023/0217211 A1 | 7/2023 | Duan et al. |

* cited by examiner

Adjacent Aisle:

Same Aisle:

PULSED OSCILLATIONS SENT

185a

DATA SENT 184a

DATA SENT

184b

DATA REC 185b

PULSED OSCILLATIONS RECEIVED

150

182

FERRITE

A 152

151

160

170

168

176

CURRENT DRIVER 180

RF TRANSCEIVER 152

SIGNAL AMPLIFIERS 156

COMPASS

PRINTED CIRCUIT ASSEMBLY

154

MICRO-PROCESSOR

172

R

MOTION SIGNAL

STOP

SLOW

MOTION SENSOR 162

164

FORK TRUCK CONTROLLER 174

| Relative Orient | Initial Separation Met-Met | Initial T1 Speed ft/sec | Initial T2 Speed ft/sec | Relative Speed ft/sec | Span 1 Distance | Span 2 Distance | Decel Rate in Span 2 | Relative Speed at Span 2 End | Separation Between Trucks | STOP Decel Rate ft/s/s | Combined Stopping Distance | Final Margin (ft) |
|---|---|---|---|---|---|---|---|---|---|---|---|---|
| M-M | 45 | 5 | 0 | 5 | 4-15 | 15-26 | N/A | 5 | 19 | 4.5 | 2.8 | 16.2 |
| M-M | 45 | 5 | 5 | 10 | 4-15 | 15-26 | 2 | 10 | 19 | 4.5 | 5.6 | 13.4 |
| M-M | 45 | 9 | 0 | 9 | 4-15 | 15-26 | 2 | 6.1 | 19 | 4.5 | 4.1 | 14.9 |
| M-M | 45 | 9 | 5 | 14 | 4-15 | 15-26 | 2 | 11.1 | 19 | 4.5 | 6.9 | 12.1 |
| M-M | 45 | 9 | 9 | 18 | 4-15 | 15-26 | 2 | 12.2 | 19 | 4.5 | 8.2 | 10.8 |
| F-F | 48 | 5 | 0 | 5 | 4-15 | 15-26 | N/A | 5 | 22 | 4.5 | 2.8 | 19.2 |
| F-F | 48 | 5 | 5 | 10 | 4-15 | 15-26 | 2 | 10 | 22 | 4.5 | 5.6 | 16.4 |
| F-F | 48 | 9 | 0 | 9 | 4-15 | 15-26 | 2 | 6.1 | 22 | 4.5 | 4.1 | 17.9 |
| F-F | 48 | 9 | 5 | 14 | 4-15 | 15-26 | 2 | 11.1 | 22 | 4.5 | 6.9 | 15.1 |
| F-F | 48 | 9 | 9 | 18 | 4-15 | 15-26 | 2 | 12.2 | 22 | 4.5 | 8.2 | 13.8 |
| M-F | 47 | 5 | 0 | 5 | 4-15 | 15-26 | N/A | 5 | 21 | 4.5 | 2.8 | 18.2 |
| M-F | 47 | 5 | 5 | 10 | 4-15 | 15-26 | 2 | 10 | 21 | 4.5 | 5.6 | 15.4 |
| M-F | 47 | 9 | 0 | 9 | 4-15 | 15-26 | 2 | 6.1 | 21 | 4.5 | 4.1 | 16.9 |
| M-F | 47 | 9 | 5 | 14 | 4-15 | 15-26 | 2 | 11.1 | 21 | 4.5 | 6.9 | 14.1 |
| M-F | 47 | 9 | 9 | 18 | 4-15 | 15-26 | 2 | 12.2 | 21 | 4.5 | 8.2 | 12.8 |
| F-M | 51 | 5 | 0 | 5 | 4-15 | 15-26 | N/A | 5 | 25 | 4.5 | 2.8 | 22.2 |
| F-M | 51 | 5 | 5 | 10 | 4-15 | 15-26 | 2 | 10 | 25 | 4.5 | 5.6 | 19.4 |
| F-M | 51 | 9 | 0 | 9 | 4-15 | 15-26 | 2 | 6.1 | 25 | 4.5 | 4.1 | 20.9 |
| F-M | 51 | 9 | 5 | 14 | 4-15 | 15-26 | 2 | 11.1 | 25 | 4.5 | 6.9 | 18.1 |
| F-M | 51 | 9 | 9 | 18 | 4-15 | 15-26 | 2 | 12.2 | 25 | 4.5 | 8.2 | 16.8 |

FIG. 7

MAGNETIC VECTOR DYNAMICS FOR MANAGING VEHICLE MOVEMENTS

This application is a continuation application of PCT/US2022/016226, filed Feb. 11, 2022, which claims the benefit of and priority to U.S. Provisional Patent Application No. 63/200,088, filed Feb. 12, 2021, the entire disclosures of which are incorporated herein by reference.

BACKGROUND

This disclosure relates generally to proximity detection systems at work sites, and in particular to proximity detection systems that allow system response to be altered depending on the particular operational situation.

The frequent serious accidents caused by vehicles and moving equipment in many industrial operations is well known, with fork trucks often being cited as the worst offenders. Many approaches have been used to reduce accidents caused by fork trucks but there remain situations where satisfactory solutions have not been found.

Pulsed, low frequency magnetic fields have proven to be reliable and effective in variety of industrial operations, including mining, warehousing, manufacturing, ports, tunneling, etc. Innate useful characteristics of the low frequency magnetic fields include being able to detect through most materials or objects, providing precision safety boundaries, and not being subject to reflections or multi-path, etc. as explained in previous Frederick patents. Thousands of these type systems have been successfully deployed in numerous types of industrial settings in many countries. Data from every vehicle is provided to dashboards via the Cloud but is not required to be instantaneous since the data is not used for providing collision avoidance. Safety decisions and necessary actions are taken directly and automatically by the systems that are on each vehicle, with the responsible oversight and interaction of the vehicle operator. Specialized auxiliary devices can be incorporated into the system for unique situations in a facility.

It is highly desirable that any system used to prevent collisions between fork trucks, pedestrians, other fork trucks, or permanent structures be effective throughout a facility. It is not desirable to equip some pedestrians and fork trucks and other equipment using one type technology, for one part of a facility, while having to use a different technology in another part of the facility. For example, RF based systems may be somewhat effective to alert personnel about an approaching vehicle within an open work area, where precision is not critical; but, when, in the same facility, it is necessary for pedestrians to work safely while being closer to moving vehicles, the system may not have the required higher precision.

Optical systems may be used in some settings where there is good visibility but not work well where pedestrians may be out of view of a vehicle operator due to high stacks of products, or pallets stacked high with packaged goods, large rolls of paper, or tall metal storage racks, etc. The challenge of satisfying collision avoidance requirements throughout a facility becomes an acute consideration when a significant part of a facility is filled with very tall, metal rack storage systems, but within various other parts of the facility, roadways, sorting areas, staging areas, conveyors, and docking ports need reliable collision avoidance. It is also not practical to use differing technologies on one type of equipment and another technology or design on another type equipment, all within the same facility. Installing multiple types of collision avoidance systems on each piece of equipment is not very practical, though it has been tried. Patchwork solutions are troublesome to manage and maintain.

What is needed, is a single technology that will be effective for all pedestrians, all fork trucks, all other moving vehicles, all stay out zones, and all zones requiring special controls, throughout the facility, including use within very narrow aisle metal rack storage systems and their associated roadways.

One attempt to provide a facility-based solution is to equip every pedestrian, every fork truck, and any other moving equipment with sensors and transponders. A large array of infrastructure elements (nodes or anchors), including transceivers and transponders, are arranged high in the facility so that they have unobstructed line of sight view of all sensors and transponders on all moving objects at every instant. Information is then sent to a centralized computer or is forwarded to the Cloud for processing. By meshing the information from all these many sources and by use of triangulation and fencing techniques, the position of each moving object can be continuously monitored relative to other moving objects, relative to fixed structures and any special zones in the facility. Much seamless-motion data is produced in this process with only specific data points being of significant value.

In order for this type of facility-based solution to be usable for collision avoidance requires that all the data derived from all elements in the infrastructure and all the information from all the moving objects and personnel be transmitted to the decision-making facility in the Cloud and that any needed collision avoidance actions be transmitted back to the facility in order to stop or slow the moving vehicles and/or to warn personnel. In a large facility there will be, from time to time, multiple concurrent actions required and some such actions must be initiated within a fraction of a second to avoid collisions. Attempts to design local sensors and transponders so that they can, at times, communicate directly with each other, instead of going through the Cloud systems, re-introduces some of the problems that have resulted in unreliable collision avoidance.

This centralized approach requires that all fixed elements of the facility, along with identified special zones, be documented and incorporated into software. Metal rack systems and associated roadways are some of the critical elements that must be precisely identified and mapped out. When modern very narrow aisle rack systems are included in a facility, one or more nodes or anchors must be above every aisle since the RF signals cannot be expected to reliably transmit through the steel rack structures and produce the desired accuracy. Thus, since it is necessary to equip, and identify all pedestrians and all moving objects and all critical structures, stay-out zones and speed zones with sensors and transponders, a large up-front investment in a complex infrastructure and software design is required. High complexity of the facility-based solutions translates into high installation cost, continuous maintenance usually resulting in monthly support fees, storage of large amounts of retrievable seamless-motion information, permanent specialized staff on duty to support Cloud functions, and other characteristics of centralized approaches.

Centralization of decisions to slow and stop the movements of fork trucks to avoid collisions re-assigns decision-making away from the operator and the vehicle for which the operator is responsible. If an unexpected condition arises or the collision avoidance system is not performing as expected, someone must determine quickly if the problem resides within a specific vehicle, is due to actions of a specific operator, is a result of a failed or damaged sensor/transponder carried by a pedestrian, etc., or if, instead, there is a system level problem that resides within the centralized control system or some of its many parts. If there is a chance that a system-level problem may exist, precautions must be taken throughout the facility. Although, such a situation should be very rare, the fact that it can occur demands that there be responsible and knowledgeable personnel monitoring system performance.

On the other hand, if an off-nominal condition arises and the system is a "local" system on the vehicle being operated, under the surveillance and control of the operator, the operator can pull the vehicle to the side or take other appropriate actions until the problem is resolved. The high priority collision avoidance function is not dependent upon remote decisions based on sets of data in the Cloud. All other vehicle operations in the facility will continue unaffected. If the system has been damaged, it can be quickly and easily replaced. Improvements incorporated into a pulsed, low frequency magnetic field collision avoidance system, as disclosed herein, not only maintain the proven high precision and high reliability to assist vehicle operators and pedestrians to avoid collisions, while minimizing nuisance alarms, but is also effective when operating within very narrow aisles in steel rack storage systems in a factory or warehouse. In addition, it provides relevant data to dashboards as needed for various facility management functions, which can be graphically presented.

Proximity detection systems (PDS) and collision avoidance systems (CAS) help keep personnel and vehicles away from dangerous areas or situations, prevent damage to facility elements that can be damaged by mobile machines, and control the actions and movements of vehicles and pedestrians. Certain circumstances or conditions may prevent the PDS/CAS systems from being effective or practical to use, however.

Advancement of magnetically-based PDS and CAS has made significant safety improvements that help prevent collisions between vehicles, machines, and pedestrians. Examples of these devices and systems are disclosed in U.S. Pat. No. 7,420,471 (the '471 patent), U.S. Pat. No. 8,169,335 (the '335 patent), U.S. Pat. No. 8,552,882 (the '882 patent) U.S. Pat. No. 8,232,888 (the '888 patent), U.S. Pat. No. 8,446,277 (the '277 patent), U.S. Pat. No. 8,847,780 (the '780 patent), U.S. Pat. No. 8,710,979 (the '979 patent), U.S. Pat. No. 8,810,390 (the '390 patent), U.S. Pat. No. 9,822,927 (the '927 patent) and U.S. Pat. No. 10,591,627 (the '627 patent), which patents are herein referred to collectively as the "Frederick patents," the disclosures of which are incorporated herein by reference in their entireties. The Frederick patents have been used successfully on, for example, fork trucks, loaders, top picks, floor sweepers, tractors, cranes, and other types of machinery.

However, improvements are needed to allow other additional safety improvements to be made within warehouse settings where storage racks are arranged to have very narrow aisles (VNA). Warehousing, manufacturing facilities, ports and numerous other types of industrial environments utilize many types of vehicles and moving equipment. In some industrial facilities, especially within warehouses, very tall storage rack systems having very narrow aisles are serviced by vehicles—usually fork trucks—designed specifically for VNA applications.

Vehicles transport materials into VNA rack areas, store the materials in the racks, and later retrieve these items. Vehicles typically travel to and from the VNA rack areas on roadways that connect areas within the facility. Collisions between these vehicles may occur while operating within VNA aisles. VNA aisles are not wide enough for the vehicles to pass each other within the aisle. As such, there is no opportunity to swerve out of the way of an approaching vehicle. In other words, if there are two vehicles in the same aisle approaching each other, the trucks must come to a stop before colliding or they will collide.

Vehicle collisions result in costly damage and injury to personnel. In addition, pedestrians must occasionally enter such rack areas for a variety of reasons, and can be struck by these materials handling vehicles, in addition to possibly being hit or crushed in other areas within the warehouse. Managing the movement of these machines and the pedestrians has been improved by use of procedures, safety tools, training, detection systems, and other means. However, collisions continue to occur and continue to be a problem.

Electronically-based and/or radio frequency (RF) detection systems, such as radio-frequency identification (RFID), may make errors and fail to provide the needed safety, but may also may result in an unacceptable number of nuisance alarms. Magnetically-based systems are especially effective for detecting vehicles and pedestrians that are equipped with PDS and CAS since the magnetic fields will pass through racks and other materials to detect where visibility is blocked. However, these magnetic fields may detect other vehicles, even when the vehicles are safely separated by the storage racks so that they may consequently also produce nuisance alarms.

Collisions between vehicles in the same aisle have occurred and are an ongoing concern. There is a special concern when a fork truck operator is elevated up into the racks by their fork truck—as high as 30 to 50 feet—to pick items from the racks. Any contact by another fork truck is a worry, at any speed, but especially at higher speeds. Contact between the fork trucks can be caused by the operator on the moving truck being distracted or careless.

The orientation of fork trucks can also be a contributing factor to the cause of a collision. An operator may be ordinarily driving while facing the motor end of their truck—motor-first—and may be fully aware of any object or person in front of them. If they are driving their truck fork-first, however—because of the presence of the fork structure and/or items being carried on the fork—they may be less likely to observe another truck, possibly one that has moved closer to them while they were occupied with picking products from the racks. Also, two trucks may enter the same aisle, oriented such that the operators of the trucks tend to be facing opposite directions.

Also, a major safety problem arises when a fork truck is exiting an aisle into a roadway and potentially into the path of other trucks on the roadway. Collisions can also happen when one truck is turning into a very narrow aisle from the roadway. And, there is a need for fork truck operators to be alerted if a pedestrian is working within the racks and pedestrians need to be aware of the arrival of fork trucks. An operator who is concentrating on positioning their truck or in picking products may not notice a pedestrian who has entered his aisle. Even when a pedestrian is in an adjacent aisle, there can be a safety problem. Products being loaded into the racks have sometimes pushed other objects through the rack that then fall from great height onto pedestrians working in adjacent aisles.

While PDS systems using low frequency magnetic fields are highly desirable to improve safety in and around the rack systems, there are some extra challenges for the VNA application. Trucks are continually passing each other in adjacent aisles. But, the magnetic fields will pass through the racks and detect other trucks in adjacent aisles. Stopping the trucks or alarming the operators when there is no danger is unacceptable. Trucks in adjacent aisles should ignore each other. As such, there is a need for a precise and reliable proximity detection system that sounds an alarm and slows and/or stops the vehicles to avoid a collision.

The current disclosure provides solutions to some of these specific needs by using vector components instead of only using magnetic field strength. Instead of relying solely upon the strength of magnetic fields as a basis for establishing safety boundaries and for providing detection methodologies, the current disclosure describes a system that utilizes unit vectors or vector components of a magnetic field to differentiate between true safety threats and non-threats that give the appearance of being a threat.

SUMMARY

The present disclosure relates to a proximity detection and collision avoidance system for vehicles such as fork trucks. The system includes a first and second vehicle, each of which has a longitudinal axis. In certain embodiments, each vehicle includes a motor-end and a fork-end. A magnetic field generator is attached to each of the vehicles. Each magnetic field generator generates a magnetic field aligned with the longitudinal axis of the vehicle to which it is attached.

A magnetic field detector is also attached to each of the first and second vehicles, with each magnetic field detector having a multidirectional vector component antennae detection axis aligned with the longitudinal axis of the vehicle to which it is attached. The magnetic field detector determines changes in the strength of the magnetic field vector components as the first and second vehicles approach each other.

The magnetic field detector generates a signal based on the determined magnetic field vector component strength that is used as an indication of the relative position of the first vehicle to the second vehicle. A data processing unit processes the signal generated by the magnetic field detector to determine whether the first and second vehicles are in the same aisle or in different aisles, indicating whether a potential collision risk exists or does not exist. In certain embodiments, a controller is attached to each of the first and second vehicles, wherein the controller can control vehicle control elements including throttle, brakes, and steering. The data processing unit is attached to the controller of a vehicle such that the data processing unit can instruct the controller to apply the brakes on that vehicle to avoid a collision. In certain embodiments, the controller further includes an alarm indicator that alerts operators of the first and second vehicles when the system senses a potential collision risk.

BRIEF DESCRIPTION OF THE DRAWINGS

FIG. 7 is a table showing stopping distances for the series of diagrams of FIG. 3.

DETAILED DESCRIPTION

This disclosure relates a system and method of analyzing vectoral components of magnetic fields to determine whether two vehicles are on the same path—in the same very narrow aisle, potentially leading to a collision—or are on parallel paths—in different adjacent very narrow aisles—and will safely pass each other.

The nature of VNA warehouses and the limited speed of typical fork trucks limit the relative speeds at which the vehicles travel. For typical commercial environments of today, the limited speed of a fork truck may be about 9 ft/sec and thus the relative speed limit between two trucks may be about 18 ft/sec. In certain embodiments, a determination of whether two vehicles are in the same aisle can be accurately and reliability made for relative speeds between 0 and 18 ft/sec. In certain alternative embodiments it may also be suitable to make such a determination when the relative speeds of two vehicles is greater than 18 ft/sec without departing from the principles of this disclosure.

Low frequency magnetic fields pass through most materials, including metal storage rack systems. Consequently, low frequency magnetic fields can be used to detect moving vehicles—such as fork trucks—that may not otherwise be visible to operators. Systems using low frequency magnetic fields have been developed (e.g., see the Frederick patents) to help to avoid collisions with other vehicles and to avoid hitting pedestrians that are not within direct vision of a vehicle operator, such as at corners or when there are objects that are obscured from view.

Figure 1:
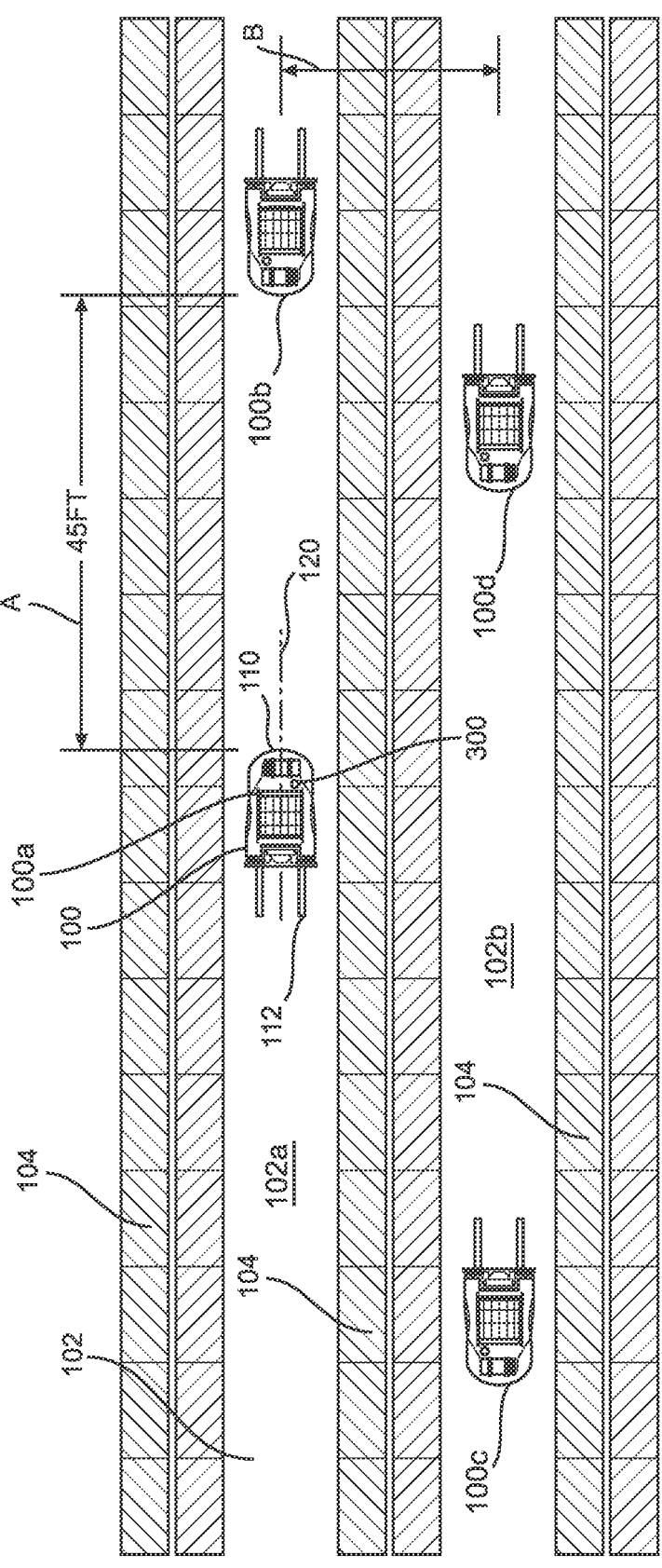
FIG. 1 is a schematic view of one embodiment of a very narrow aisle rack configuration showing fork trucks in aisles between racks using the proximity detection system in accordance with the principles of this disclosure.

Turning now to FIG. 1, one embodiment of a very narrow aisle warehouse and a plurality of vehicles—fork trucks—is shown. FIG. 1 shows a total of four vehicles 100—two in each aisle 102. The aisles 102 are separated by steel racks 104, but any suitable separation barrier may be used without departing from the principles of this disclosure. Each vehicle 100 has a motor-end 110 and a fork-end 112. Further, each vehicle 100 has a longitudinal axis 120. One aisle 102a shown in FIG. 1 shows the vehicles 100a and 100b in the same aisle separated by a distance A oriented such that the motor-end 110 of each vehicle is facing the other vehicle (an "M-M" orientation, as the motor (M) end 110 of the vehicle 100a on the left of FIG. 1 is facing the motor (M) end 110 of the vehicle 100b on the right of FIG. 1). The adjacent aisles 102a and 102b are separated by a distance B, which is the distance between the respective centerlines of the aisles. The distance B may be, for example, about 14 ft in some VNA environments, but distance B may be other values. FIG. 1 also shows vehicles 100 in the same aisle 102b, but the vehicles are both pointing in the same direction (an "F-M" orientation, as the fork (F) end 112 of the vehicle 100c on the left of FIG. 1 is facing the motor (M) end 110 of the vehicle 100d on the right of FIG. 1).

A PDS system 10 includes one or more PDS modules 300 attached to each of the vehicles 100. Each module 300 includes a magnetic field generator that generates a magnetic field aligned with the longitudinal axis 120 of the vehicle 100 to which it is attached. Each module 300 also includes a magnetic field detector 151 having a multidirectional vector component antennae 152 detection axis aligned with the longitudinal axis 120 of the vehicle 100 to which it is attached. The magnetic field detector 151 determines changes in the strength of the magnetic field vector components as the first and second vehicles approach each other. PDS system 10 may include other elements in addition to PDS modules 300 without departing from the principles of this disclosure. Example additional elements may include additional sensors, controllers, etc.

The magnetic field detector 151 generates signals based on the determined magnetic field vector components strengths. Each module 300 also includes a data processing unit 172 processes the signals (responses) generated by the magnetic field detector 151 to determine whether the longitudinal axes 120 of the first and second vehicles 100 are on the same path (in the same aisle 102) and/or on different paths (not in the same aisle), indicating whether a potential collision risk exists or does not exist. In the embodiment shown, data processing unit 172 includes at least microprocessor, but may include other components without departing from the scope of this disclosure. In certain embodiments, a controller 174 is attached to each of the first and second vehicles 100, wherein the controller can control vehicle control elements including throttle, brakes, and steering. The data processing unit 172 is attached to the controller of a vehicle such that the data processing unit can instruct the controller to apply the brakes on that vehicle to avoid a collision. In certain embodiments, the controller further includes an alarm indicator that alerts operators of the first and second vehicles when the system senses a potential collision risk.

Figures 3A, 3B, 3C, 3D:
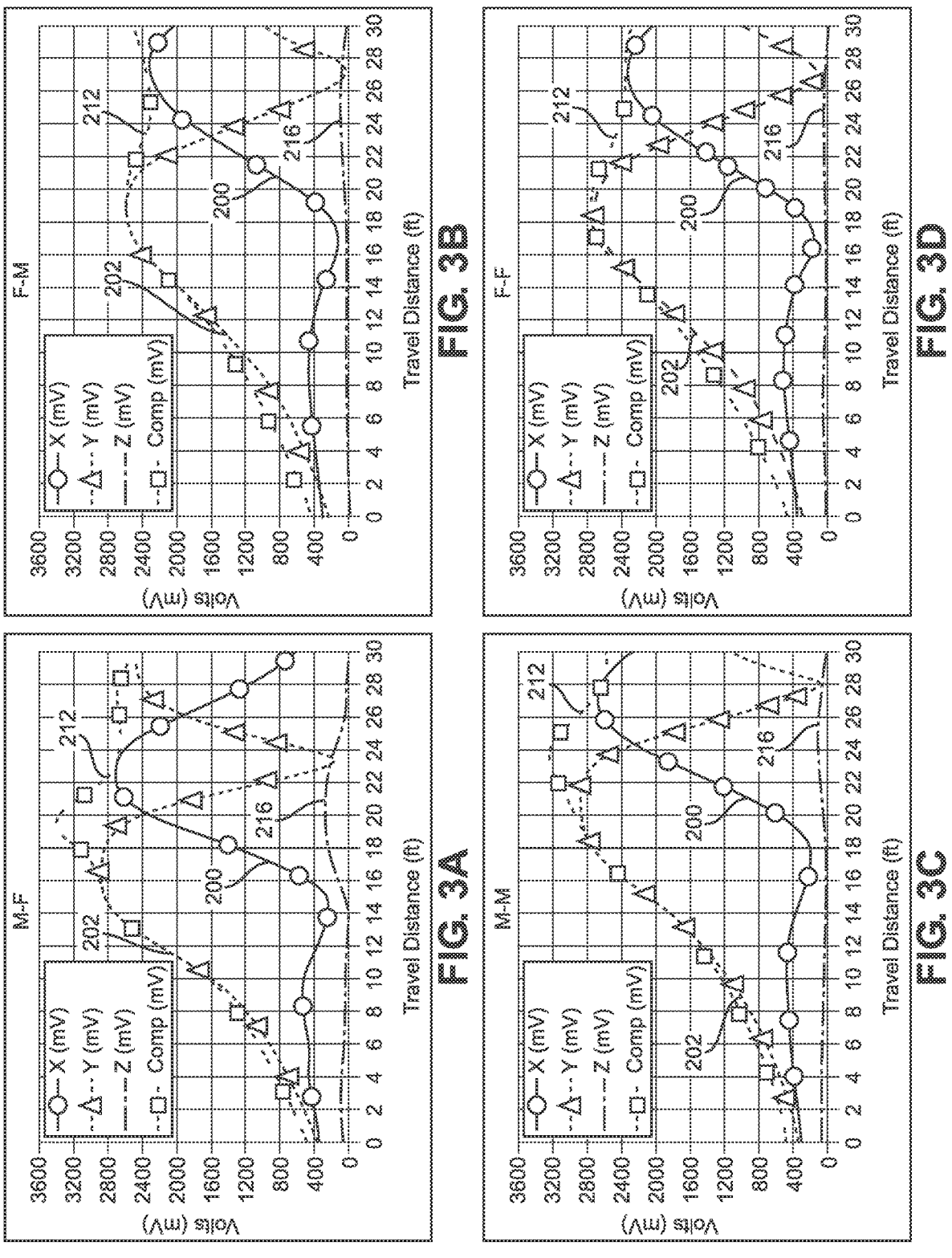
FIGS. 3a, 3b, 3c and 3d show a series of vector diagrams for two vehicles in adjacent aisles.
Figure 4:
FIG. 4 is a schematic block diagram of one embodiment of a proximity detection system in accordance with the principles of this disclosure.

Turning now to FIG. 4, a block diagram of the PDS 10 is shown. The PDS 10 measures the vector responses 200, 202, 216 (see FIGS. 2, 3, 5 and 6) of the pulsed magnetic fields (PINGs) 185b produced by a PDS on a second vehicle and correlates those responses to the distance of separation between the PDS's. Refer to the Frederick patents regarding PING-ECHO techniques for collision avoidance and proximity detection systems. The distance of separation between the PDS's determines the distance of separation between the vehicles 100 because the PDS's are mounted to the vehicles. PDS 10 analyzes at least one of the vectoral responses 200, 202, 212, 216, and can command a controller 174 on vehicle 100 to slow or stop, as needed.

Analysis of the vectoral responses 200, 202, 212, 216 to determine whether the trucks are in adjacent aisles or the same aisle requires one to know the relative distance of separation between the trucks, measured in the direction of movement along their paths. Determining the actual separation of the systems on the fork trucks requires a system that is designed for that purpose. FIG. 4 is a block diagram depicting a PDS system with the capability of measuring the vectoral components of PINGs and of correlating those values to the distance of separation.

Most of the functionality of PDS 10 is integrated onto a Printed Circuit Assembly (PCA) 168 that is contained within a non-metallic housing (not shown). In addition, information must be acquired from the control elements of the vehicle 100, shown here as a controller 174. Information obtained from controller 174 can be acquired from a sensor 162 on one of the wheels 164. Motion information could alternatively be acquired from optical devices, or other motion detection devices without departing from the principles of this disclosure.

Data processing unit 172 acquires information from the controller 174 and from an RF data stream 184 (184 refers to 184a and/or 184b in FIG. 4) that is sent concurrent with the pulsed low frequency magnetic fields 185 (185 refers to 184a and/or 185b in FIG. 4) in a manner described in earlier Frederick patents. The data processing unit 172 also acquires directional information from a compass 170 located on the PCA 168. By logically combining this information, the data processing unit 172 can calculate the relative speed and distance travelled, relative to another PDS 10. The essential requirement is to be able to measure the vectoral components of the PINGs 185 to correlate the values of each component vector response 200, 202, 212, 216 to the change in relative distance between the vehicles 100, to apply algorithms and to make decisions based on the results of the algorithms. Determination of whether the vehicles 100 are safely in adjacent aisles or are on a collision course within the same aisle is made based on the changes in the strength of the vectoral responses 200, 202, 212, 216.

Three orthogonal, wound ferrites 151 acquire the PINGs 185 and send voltages for each of the ferrites to three signal amplifiers 160. After being amplified, the responses 200, 202, 212, 216 are sent to the data processing unit 172 where they are analyzed using algorithms that are described later.

Motion, orientation, and direction of travel information from the vehicle 100 that is generating the PINGs 185 is acquired from the RF data stream 184 by the RF transceiver 180 after being detected by RF antenna 182. The same type information is sent through a data stream 184 from the transceiver 180 to a PDS 10 on the other vehicle 100 that is functionally equivalent to the PDS on the current vehicle. PINGs 185 are generated by a ferrite 158 and sent to the other vehicle to be received in like manner. Current required to produce the PINGs 185 in the ferrite 158 is supplied by current driver 176. Details on how pulsed low frequency magnetic fields (PINGs) are produced can be understood by review of disclosures in previous Frederick patents for proximity systems and collision avoidance systems. If the PDS 10 determines that vehicle 100 needs to be slowed down and/or stopped, signals from the PDS 10 are sent to the controller 174, which can control at least the throttle and brakes on the vehicle.

In certain embodiments, alarm indicators on the vehicle 100 alert the operator when PDS 10 determines that there is another vehicle within its range causing a collision risk. Example alarm indicators may include a sounder a light such as an LED.

As shown in FIGS. 2, 3, 5 and 6, magnetic fields are measured and analyzed by PDS 10. Specifically, the vectoral components of the fields can be measured and analyzed as their responses change while the vehicles 100 approach each other. It should be noted that the vehicles 100 may be getting closer to each other because both vehicles are moving toward each other at various possible speeds, one vehicle may be stopped, or they can both be moving in the same direction with the trailing vehicle moving faster.

Detection of the slope of the vectoral components of a magnetic field will be different when the detector is aligned with the axis 122 of the field generator 150—typically aligned with the longitudinal axis 120 of vehicle 100—than when offset on a parallel axis. Thus, when two vehicles 100 are moving down adjacent aisles, the slope of vectoral components from a magnetic field produced by one vehicle 100, and detected by the other vehicle 100, will be different than if the vehicles were in the same aisle. If the axis of the field generator 150 is aligned with one aisle 102 and the detector is aligned with a parallel, adjacent aisle, there will be predictable differences that can be used to slow or stop the vehicles 100 and/or to alarm the operators.

Figures 9A, 9B:
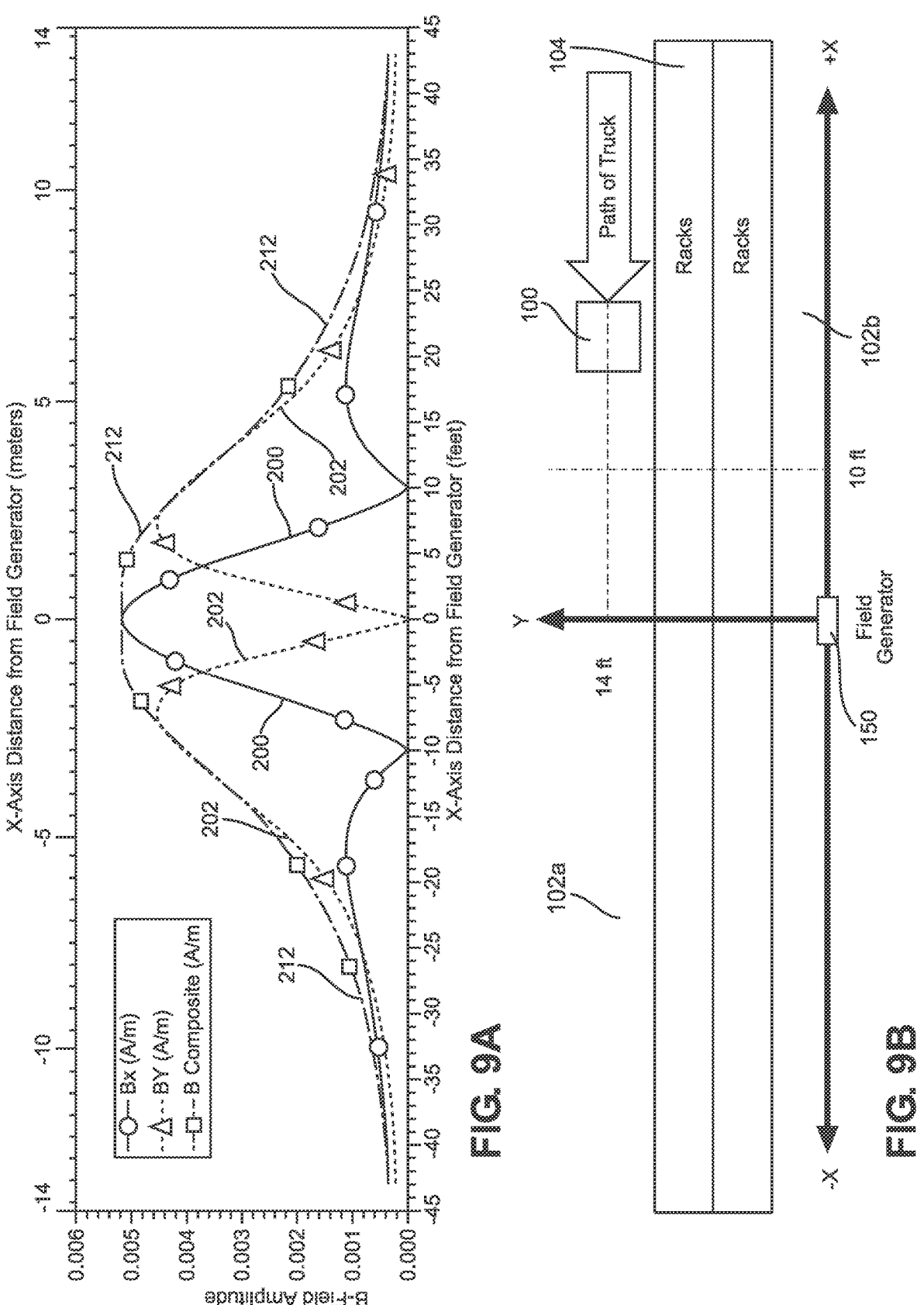
FIGS. 9a and 9b are vector diagrams showing theoretical responses from an X-axis sensor and a Y-axis sensor using the proximity detection system in accordance with the principles of this disclosure.

Refer now to FIG. 9 that illustrates the theory of the present disclosure. FIG. 9*b* shows the two aisles 102, one on either side of storage racks 104. In the embodiment shown, the centers of the aisles 102 are separated by approximately 14 feet. A field generator 150 in one aisle 102 generates a magnetic field. The magnetic field has a composite field strength B and an X direction vector component field strength Bx and a Y direction vector component field strength By. As a truck—vehicle 100—in the adjacent aisle 102*a* moves from the right to the left in FIG. 9, theoretically, it should sense the magnetic field. As shown, magnetic field has field strength values B, Bx and By. FIG. 9*a* is a plot of the calculated theoretical field strengths B, Bx and By. In FIG. 9*a*, it can be seen that as vehicle 100 moves from the right to the left: (1) the composite field strength B continuously increases (positive slope) until the vehicle 100 is directly across the racks from the field generator, i.e., there is zero X dimension separation distance between the vehicle and the field generator; (2) the Y direction vector component field strength By continuously increases until it reaches a peak and then decreases (negative slope) to a zero value when the truck is directly across the racks from the field generator; and (3) the X direction vector component field strength Bx continuously increases until it reaches a first peak and then decreases to a zero value before the vehicle 100 is directly across the racks from the field generator 150, and then again continuously increases until the vehicle is directly across the racks from the field generator. As the vehicle 100 continues to move to the left, the mirror images of the composite and vector component field strengths B, By and Bx are predicted.

We have recognized that the phenomenon of the vector component field strength curve slope changing from positive to negative at a vehicle-field generator separation distance greater than zero may be used to determine whether two vehicles 100 are positioned in the same aisle 102 or in separate aisles, with sufficient time to control the vehicles to avoid collision. This is particularly true considering that the X direction vector component field strength for two vehicles 100 in the same aisle does not exhibit this slope changing phenomenon, but, rather continuously increases as the two vehicles approach one another. Thus, by detecting the presence or absence of this phenomenon for the X direction vector component of the magnetic field strength, a same-aisle/adjacent-aisle determination may be made. The phenomenon may be also be used by sensing for a significantly decreasing (even before it goes negative) slope of X direction vector component of the magnetic field strength.

Figure 2A:
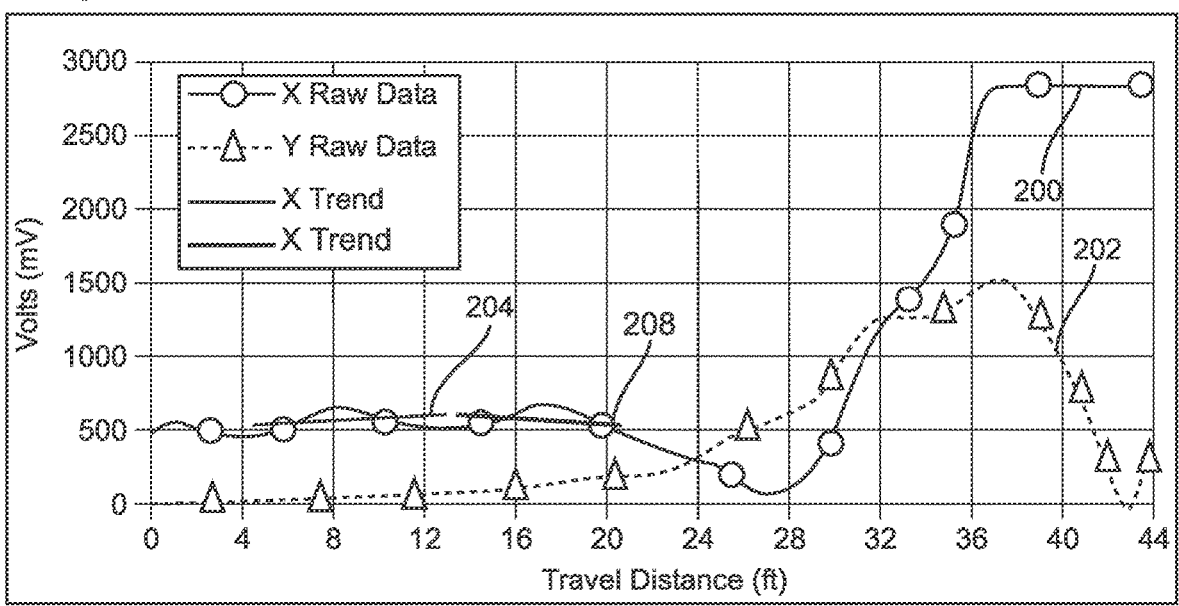
FIGS. 2a and 2b are vector diagrams showing responses from the X-axis sensor, Y-axis sensor, and Z-axis sensor using the proximity detection system in accordance with the principles of this disclosure.
Figure 2B:
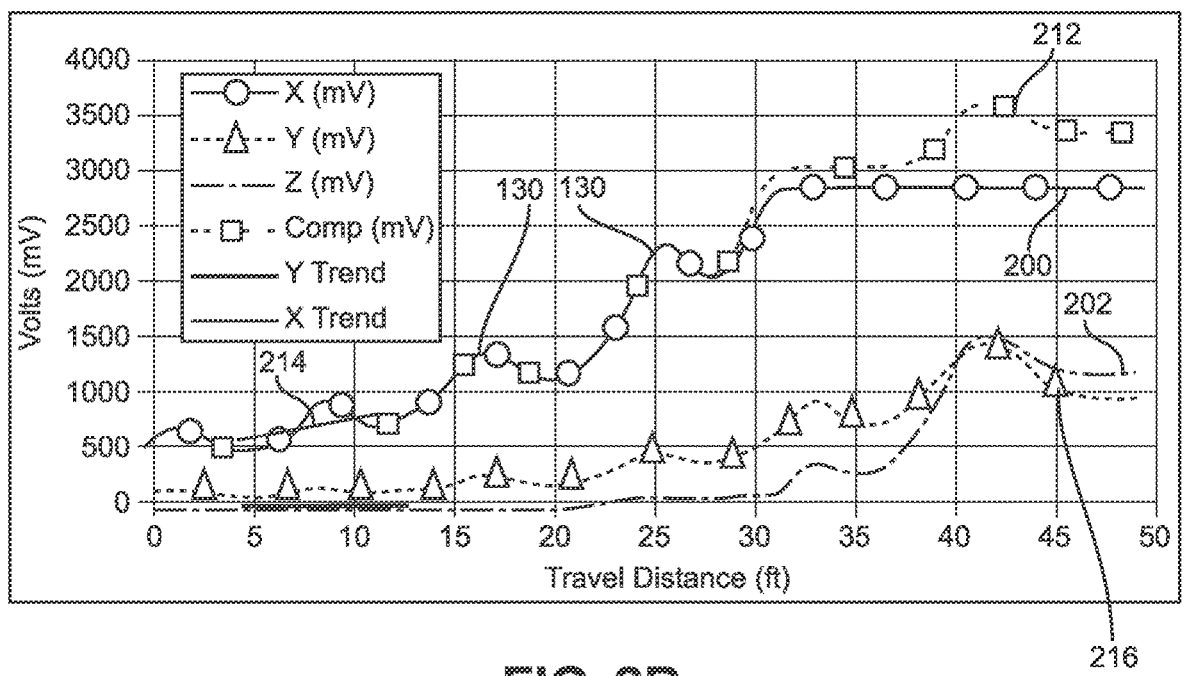

FIGS. 2*a* and 2*b* show typical vectoral responses 200, 202 of magnetic fields in a NINA configuration. FIG. 2*a* shows the vectoral response 200 from X-Axis sensor 154 and the vectoral response 202 from Y-Axis sensor 156 in PDS 10 as the relative distance decreases between two vehicles 100 in adjacent aisles. FIG. 2 is from actual data taken in a NINA configuration, in contrast to the calculated theoretical values of FIG. 9. The "travel distance" of FIG. 2 is related to the relative distance between the two vehicles 100. The travel distance is set to zero when a vehicle detects that the composite magnetic field strength generated by another vehicle exceeds a threshold value. PDS 10 then uses information indicative of the X distance and direction traveled by each of the two vehicles 100 to calculate the distance they have moved towards one another in the X direction. If they have moved 10 feet closer together since the threshold is sensed (at zero travel distance), then the travel distance is 10 feet. The travel distance is in the X direction along the aisle, and is calculated the same way regardless of the fact of whether the vehicles 100 are in the same aisle 102 or in adjacent aisles, as that fact is unknown and is precisely what is being determined. As the travel distance increases, the separation distance decreases.

As shown in FIG. 2*a*, the vectoral response by the X-Axis sensor 154—X Raw Data initial trend line 204—is rising slowly, up to a point and then begins to reduce—X Raw Data secondary trend line 208. As the relative distance between the vehicles 100 decreases, the slope of vectoral response 200 from X-axis sensor 154 increases—indicating a strengthening of the sensed magnetic field—while the angle between the magnetic lines from the magnetic field generator on one truck cut through the parallel path at a steeper angle. And, as the magnetic field lines from the vehicle 100 in one aisle become perpendicular, the slope of vectoral response 200 turns negative and in ideal conditions would actually reach zero. However, due to environmental factors—including the vehicle 100 to some degree—the response 200 does not reach zero. Also, the fluctuations in the responses are due to the periodic features in the rack systems. For example, see the fluctuations 130 in FIG. 2*b*. The presence of the rack 104 structure affects the magnetic field, so that the graph of the sensed field strength vector components may have humps and are not as smooth as shown in the theoretical calculated values of FIG. 9. However, they still exhibit the phenomenon of the slope of the component field strength increasing and then decreasing as the vehicles approach one another. The slope of the field strength may be calculated over a sufficient travel distance to decrease the effect of the fluctuations.

In contrast to FIG. 2*a*, which shows vectoral responses 200, 202 in adjacent aisles, FIG. 2*b* shows the vectoral responses 200, 202 when the vehicles 100 are in the same aisle 102 are distinctly different. When in the same aisle 102, the slope 214 of vectoral response 200 to the X-Axis sensor 154 generally increases to the point of saturation of the sensor. As explained in more detail later, this distinction between same-aisle and adjacent-aisle vectoral responses 200, 202 supplies the information necessary to make automatic decisions to slow and/or stop the vehicles 100.

Also shown in FIG. 2*b* is the Z-Axis response 216 and the composite vector response 212 which is the combination of all three orthogonal vectors. The composite vector 212 will be addressed later as a parameter that can be used for control.

Dynamic vector responses measured by a PDS 10 on a vehicle 100 that is traveling on a path that is parallel to the path being followed by a pulsed magnetic field generator 150 are dictated by the physical separation between the paths. Speed is not a factor so long as the pulse rate of the low frequency magnetic fields is sufficiently high for the speed. Magnetic fields from a typical low frequency system will be reversing direction approximately 73,000 times per second within each pulse so that the speed of travel is obviously not significant to the field configuration. A typical VNA facility usually limits the maximum speed of the fork trucks to about 8 to 9 feet per second when operating within the racks. As a result, two vehicles 100 closing at a maximum rate of 18 ft/sec may need a pulse rate at critical decision points of about 15 pulses per second for good performance. The pulse rate can be automatically controlled to meet desired requirements for the specific design parameters of the system.

The plots in FIGS. 2a and 2b were taken within a VNA rack system while the vehicles 100 were oriented with the fork-end 112 of one vehicle pointing in the opposite direction of the fork-end of the other vehicle. Put another way, the motor-ends 110 of the vehicles 100 were facing each other. FIG. 3 shows some variations experienced for vehicles 100 in adjacent aisles 102 between the four possible orientations of the PING receiving vehicle to the PING transmitting vehicle—motor-end 110 to motor-end (M-M, FIG. 3c), motor-end to fork-end 112 (M-F, FIG. 3a), fork-end to motor-end (F-M, FIG. 3b), and fork-end to fork-end (F-F, FIG. 3d). Note that the FIG. 3 data was taken without the rack structure, so the data does not include the fluctuations that would be caused by the rack structure. In each orientation, as shown, the slope of vectoral response 200 to the X-axis sensor 154 turns negative as the relative distance between the vehicles 100 decreases. As such, when the PDS 10 determines that the vectoral response 200 to the X-axis sensor 154 trends negative, as shown in X Raw Data secondary trend 208 the system can accurately identify a potential collision risk. FIG. 7 is a table showing stopping distances for the series of diagrams of FIG. 3.

Although the emphasis in this disclosure has been placed on using vectors to control vehicles 100 operating within very narrow aisle rack system, the PDS 10 may be utilized for other purposes such as sensing other objects, pedestrians, or racks without departing from the principles of this disclosure.

As discussed above, PDS 10 measures and analyzes vectoral responses 200, 202, 212, 216 of the PINGs 185 relative to the distance between the PDS and a PDS mounted to another vehicle. Vectoral responses 200, 202, 212, 216 when two PDS's 10 are located in the same VNA aisle are different than if one PDS is in a first aisle and a second PDS is in an adjacent aisle.

FIG. 2a shows X-Axis response 200 and Y-Axis response 202 from a test for vehicles 100 in adjacent aisles 102 within VNA racks. A distinctive decreasing slope in X-axis response 200 and a peak in the Y-axis response 202 can be expected, as explained earlier. Even though the steel racks 104 produce fluctuations in the vectoral responses 200, 202, the general trends of the vectors are reliably distinctive when evaluated relative to the separation of the PDS's 10.

FIG. 2b shows that the X-Axis response 200 for two vehicles 100 moving toward each other in the same aisle 102 does not reach a maximum value and turn negative to a significant low value as it did in the adjacent-aisle response in FIG. 2a. Tests performed on VIVA fork trucks, not within rack systems, show a similar response without the fluctuations 130 caused by steel racks 104. Tests performed on non-magnetic carts in open air demonstrate this characteristic dip without the effects of racks 104 or of the vehicles 100. This distinction can be used to determine whether vehicles 100 are traveling in parallel paths or are traveling along the same path, toward each other.

There are multiple possible ways to analyze the vectoral responses 200, 202, 212, 216 relative to the separation of the vehicles 100. By applying algorithms to the vectoral responses 200, 202, 212, 216 over a range of distances, two examples are described below that produce a high confidence in being able to prevent collisions between two vehicles 100 in the same aisle 102, while minimizing the likelihood of impacting vehicle operations in adjacent aisles.

Upon first indication that the vehicles 100 may be in the same aisle 102—and having a potential collision risk—the vehicles are commanded by the PDS's 10 to begin slowing. But, if the calculations show that the vehicles 100 are more likely in adjacent aisles 102, no slowing action is taken. If subsequent calculations by the PDS's show conclusively that the vehicles 100 are on a collision course within the same aisle 102, stopping the vehicles 100 will be easier if not traveling at higher speeds. If subsequent calculations continue to show that the vehicles 100 are in adjacent aisles 102, then no slowing action will be taken. It should be noted that vehicles 100 frequently pass each other in adjacent aisles 102 and must not be affected by the PDS Yet, in the case that two vehicles 100 are in the same aisle 102—on a collision course—they will be stopped. Being conservative for safety, if separation between the vehicles 100 may be less than a predetermined distance and no decision has already been made to stop the vehicles, they will be given a stop command at that point. For example, if the magnetic field generators are set to generate a field strength having a threshold value at 45 feet, and the maximum speed of the vehicles is about 8 to 9 feet per second, the calculated predetermined distance may be about 21 feet. Other values may be used depending on the configuration of the aisles, racks vehicles and other factors. It is desirable for the threshold field strength to be set at a sufficient distance so the system can collect sufficient data to determine whether the vehicles are in the same aisle or in different aisles, before the calculated separation between the vehicles has decreased to a distance where the stop command must be given.

Although there are multiple rack 104 configurations produced by different manufacturers and multiple VNA trucks produced by multiple manufacturers, the system and method described herein should be effective in a broad range of applications under a wide range of conditions. Of course, adjustments of the system ranges and the algorithm parameters can be made, if necessary, for particular configurations of racks 104 and vehicles 100.

Following is a discussion of an example PDS 10 in accordance with the principles of this disclosure, based on a typical steel rack storage system that has two rows of double racks 104, totaling an approximate width of 9 feet and with aisles that are approximately 5 feet wide. Two algorithms and logic sets are presented. The first analyzes the slopes of the X-Axis vectoral response 200 and Y-Axis vectoral response 202 and makes decisions based on these slopes as the separation between the vehicles 100 decreases. The second analyzes the ratio of the composite vectoral response 212 to the X-Axis vectoral response 200 and makes decisions based on those ratios.

Figure 5A:
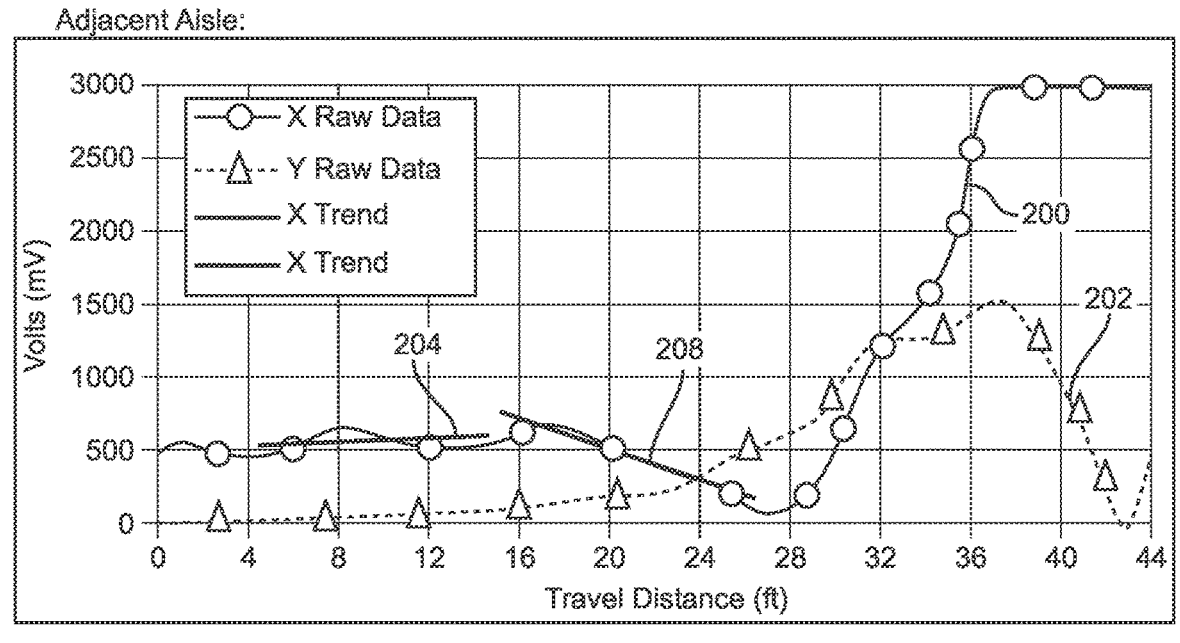
FIGS. 5a and 5b are vector diagrams showing responses from an X-axis sensor and a Y-axis sensor using a proximity detection system in accordance with the principles of this disclosure.
Figure 5B:
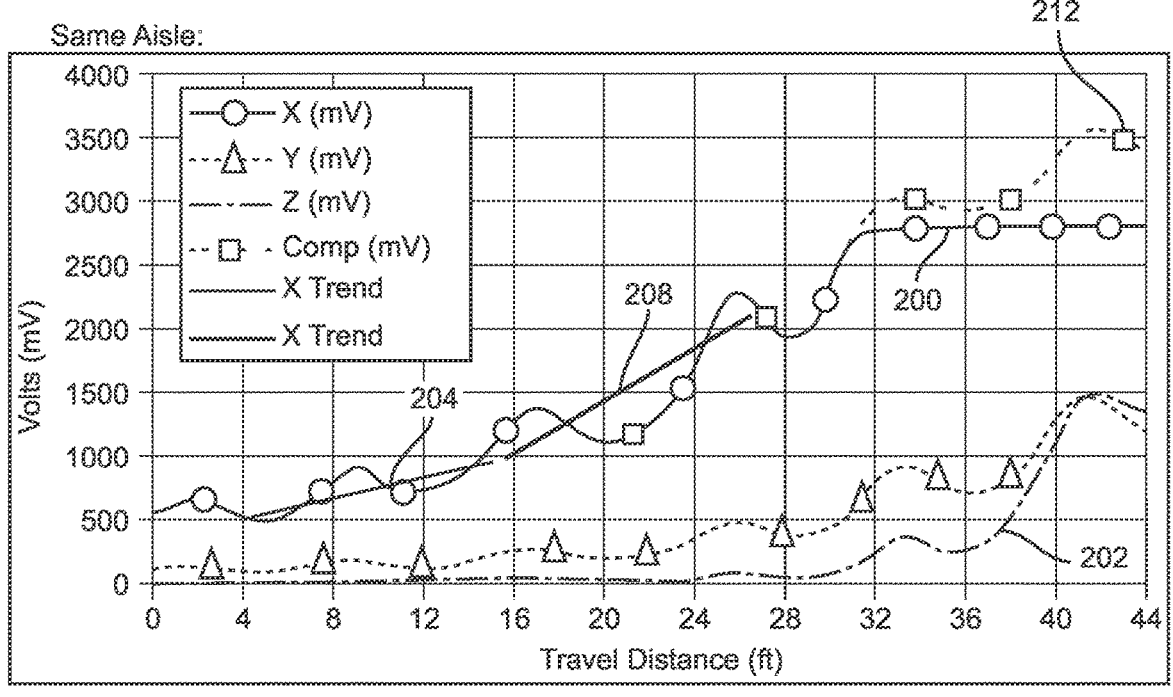
Figure 6A:
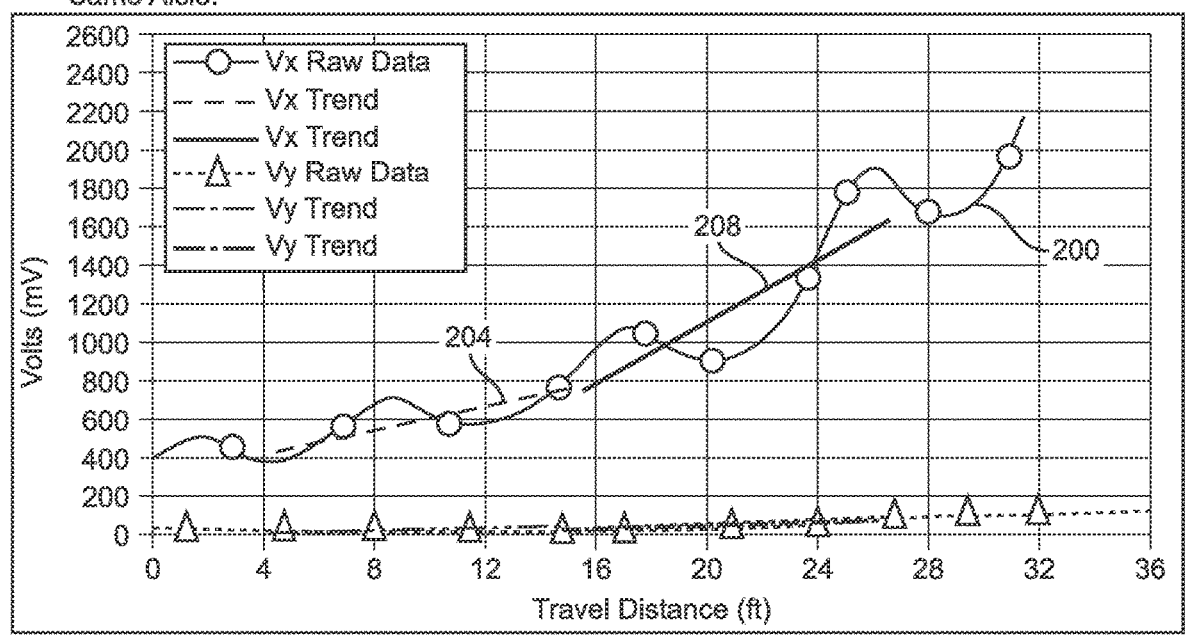
FIGS. 6a and 6b are vector diagrams showing responses from an X-axis sensor and a Y-axis sensor using a proximity detection system in accordance with the principles of this disclosure.
Figure 6B:
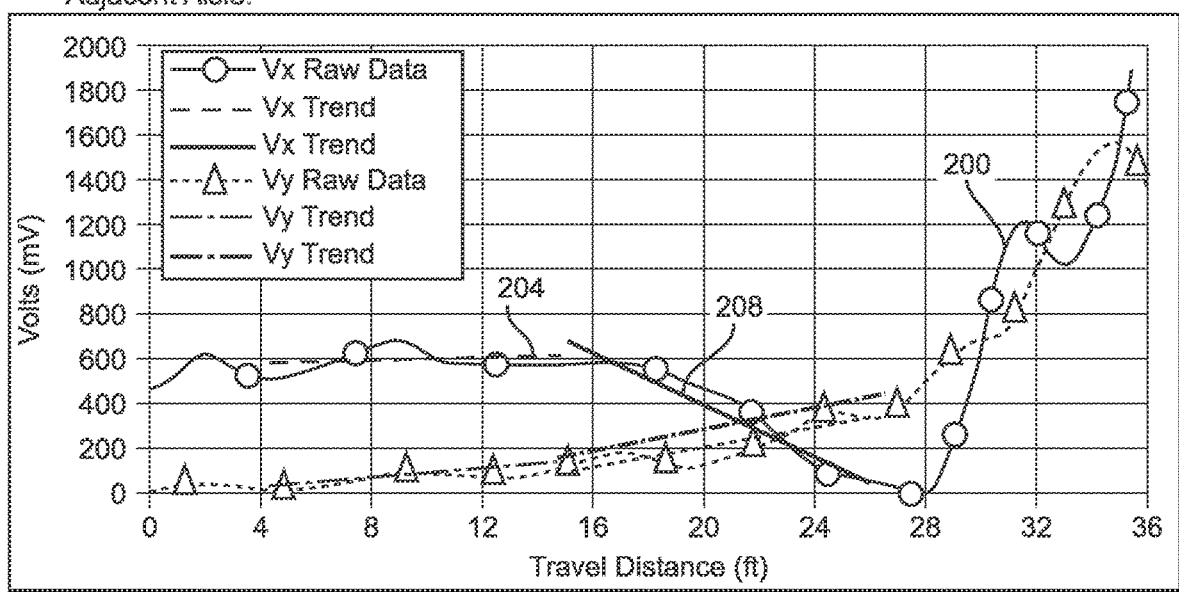

FIG. 5 show two plots, one for vehicles 100 being in adjacent aisles—FIG. one for vehicles 100 being in the same aisle—FIG. 5b. X Raw Data initial trend line 204 and X Raw Data secondary trend line 208 are shown along the plots of the X-Axis vectoral response 200. After PINGs 185 are received above a specified level, entry into the magnetic field is determined to have started. As shown, the vehicles 100 can move 4 feet closer before trend measurements are begun because there can be some variability upon first entry. Afterwards, the X-Axis vectoral responses 200 of the PINGs 185 are measured as the vehicles 100 move closer together and the signals are recorded along with the distance of separation between the vehicles. After the vehicles 100 have moved a specified distance—11 feet in this instance—a linear curve fit is made to all the X data taken over the last 11 feet, and the X Raw Data initial trend line 204 is calculated. Distances other than 4 feet and 11 feet of the example may be used, as suited for the variabilities of the magnetic field strength in a particular aisle environment. The slope of the X Raw Data initial trend line 204 is significantly different between adjacent-aisle and same-aisle responses. For example, the slope may be about 45 mV/ft or higher for same-aisle and about 10 mV/ft for adjacent-aisle. So, in this example, a slope somewhere in the middle can be chosen as a threshold for an initial indication of whether the responses indicate same-aisle or adjacent-aisle. For example, if the X Raw Data initial trend line 204 slope is greater than about 25 mV/ft (millivolts per foot), this is an early indication that the vehicles 100 may be in the same aisle 102. In certain embodiments, if the vehicle 100 is moving faster than 5 feet per second, it will be commanded to slow. Each PDS 10 on each vehicle 100 should arrive at the same conclusion at approximately the same time. If the X Raw Data initial trend line 204 is less than 40 millivolts per foot, this will be an early indication that the trucks are in adjacent aisles and this first measurement will be ignored.

FIG. 5a shows that the X-Axis vectoral response 200 slope rises as the vehicle separation distance decreases (travel distance increases) up to a point that it begins to reduce and eventually has a negative slope. In contrast, as shown in FIG. 5b, when in the same aisle, the X-Axis vectoral response 200 slope continues to rise up to the point of separation. This phenomenon may be used to distinguish indicate same-aisle or adjacent-aisle.

Following the initial decision described above that may or may not have resulted in slowing one or both of the vehicles 100, depending upon their speed at the time that the decision is made, a second calculation will be made. The second calculation will be made after the trucks have moved still closer, in this case, another two feet. However, in another aspect of this disclosure, this calculation and the others that follow will be made by comparing the slope of the X-Axis vectoral response 200 with the Y-Axis vector response 202, these being shown in FIGS. 6a and 6b. The data for this calculation will be acquired from the PINGs 185, and the calculations for each PING, for the previous 11 feet. If the slope of the X-Axis vectoral response 200 is greater than the slope of the Y-Axis vectoral response 202, the previous slow command will be held or will be given for the first time. If the slope of the X-Axis vectoral response 200 is negative, the other vehicle 100 will be tagged as being in an adjacent aisle and will remain as being adjacent until reset in the manner described later. If the X-Axis vectoral response 200 is not negative and is not greater than the Y-Axis vectoral response 202, another tentative decision will be made that the trucks are in adjacent aisles.

A third calculation may also be made, as the second calculation, after the vehicle separation has reduced another two feet, after closing a total of 19 feet, using data and PING calculations recorded for the previous 11 feet.

A fourth calculation may also be made, similar to the third calculation, after the vehicle separation has reduced another two feet, i.e., closing a total of 21 feet, using data and PING calculations recorded for the previous 11 feet. If the slope of the X-Axis vectoral response 200 is less than the slope of the Y-Axis vectoral response 202, the other vehicle will be tagged as being in the adjacent aisle and will be ignored until reset as described later. If not, the vehicle 100 will be given a stop command. If one vehicle 100 determines that a second vehicle is in an adjacent aisle, it will tag an I.D. of the second vehicle. If the second vehicle 100 goes out of range for more than 20 seconds, the tag will be removed. For systems that use a locating aisle wire located in the aisle floor, if the first vehicle 100 drops off the aisle wire, it will drop all its tags.

Figure 8A:
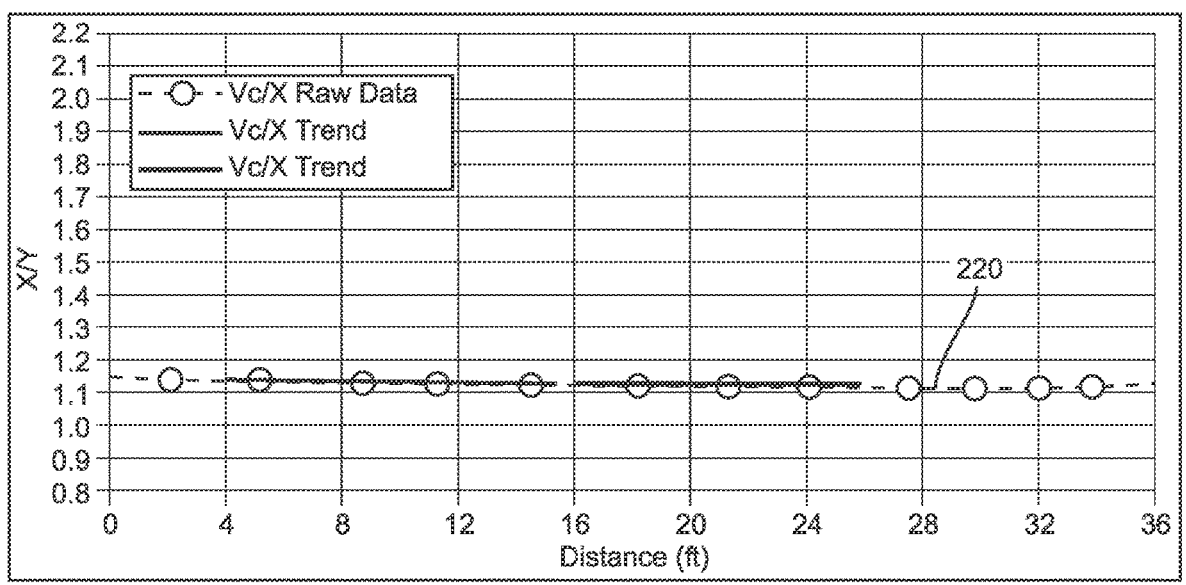
FIGS. 8a and 8b are vector diagram showing Vc/Vx ratios obtained using the proximity detection system in accordance with the principles of this disclosure.
Figure 8B:
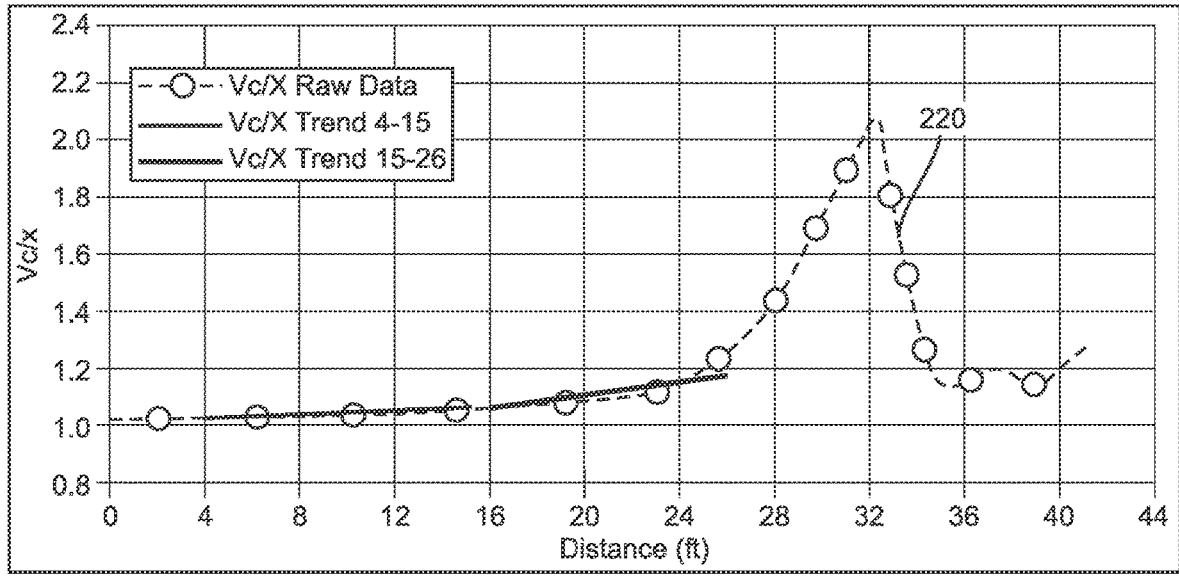

As shown in FIG. 5b, if two vehicles 100 are moving closer together along a single axis, the composite vector value 212 will, ideally, be produced solely by the value of the X-axis vectoral response 200. In that case, the ratio of composite vector value 212 to the X-Axis vectoral response 200 will be one (1) (see FIG. 8a). In a typical operating environment, that ratio will be somewhat larger, although not significantly larger. If the vehicles 100 are in adjacent aisles, however, the ratio will increase significantly as the trucks close. (See FIG. 8b) Consequently, the ratio of composite vector value 212 to X-axis vectoral response 200 (Vc/Vx) 220 can be used as a positive verification for the decision about whether an approaching vehicle 100 is in the same aisle 102.

Following a tentative decision after the first algorithm, an average for the Vc/Vx ratio 220 for the previous five PINGS 185 will be calculated after the vehicles 100 have moved another two feet. If the ratio rises to a value of, for example, greater than or equal to 1.2, the decision will be made that the vehicles are in an adjacent aisle 104 and will be tagged and ignored until reset as explained earlier. This process will be repeated if separation between the vehicles 100 is be less than 21 feet and no decision has already been made to stop the vehicles, they will be given a stop at that point. Other values for the ratio and separation distance as well as other values of the examples given in this disclosure may be used depending on the configuration of the operating environment, including the properties of the aisles, racks, vehicles, MFGs, and other factors.

A characteristic of low frequency magnetic fields used for a PDS system is that the magnetic fields can pass through most objects to allow detection on the opposite side of the object. This characteristic may be a factor in many industrial settings, including when lift trucks are within a VNA metal rack storage system, so that a truck that is planning to exit a VNA aisle can detect trucks that are traveling along roadways that the truck will be entering. The PDS system will detect the trucks even though they are not visible to the operator. One consequence of this "see through" capability is that trucks in VNA aisles will detect trucks that are in adjacent aisles where they are completely safe. It is essential that trucks in adjacent aisles not be affected as they enter the magnetic fields of other trucks.

Proper application of a PDS system will allow each truck, in combination with the operator, to function in an autonomous manner, making their own decisions. Each PDS system detects other trucks or pedestrians or facility locations that have been marked and then makes decisions that are appropriate for the specific type truck, operating preferences for the specific facility or circumstances, products being handled, experience and training of the operator, etc. If the operator is unsure about how the PDS system is functioning or how the materials handling should be managed, the operator knows that he/she can pull the truck off-line to clear up any questions without consideration of any external or centralized factors. A truck/PDS system is designed to avoid failures, and for example will alert the operator to any internal faults so the machine can be taken out of service. It does not affect other vehicles once it is offline and conversely, when in operation it is not affected by system maintenance or issues with a centralized facility controller.

A vehicle traveling along a path is outfitted with a solenoid that is aligned with the path, driven by an oscillating current, an oscillating magnetic field will be produced that extends in all directions. The magnitude of the field will be greatest in the direction of the axis through the solenoid. If a second vehicle is traveling toward the first vehicle on a parallel path and the vehicle is equipped with a solenoid detector that is aligned with its path of travel, the signal will appear to be nearly on the same path as the first truck when they are separated by a great distance. As the distance between the vehicles draw closer together, the strength of the field will be increasing, whether in the same aisle or in adjacent aisles (see FIG. 5a and FIG. 5b, based on a 44 feet travel distance (which is towards one another in the X direction)). With large separations between the trucks, the rate of increase in both cases will be similar and difficult to differentiate due to the fluctuations caused by the racks and other factors. (See FIG. 5a and FIG. 5b, 204)

However, as the separation between the vehicles reduces, there will be a second factor that begins to reduce the rate of signal increase, as the direction of the field changes due to the two paths being traveled by the two vehicles being separated (See FIG. 5a, trend line between 15 and 27 feet. This factor is due to the direction of the magnetic flux lines will increasing become more perpendicular to the axis of the detection solenoid. When perpendicular, the signal detected will be zero, under ideal conditions (see FIG. 9a, distance minus ten (−10) feet), but will be a minimum under commercial conditions (see FIG. 5a, travel distance 43 feet). These two factors are competing so that as the trucks continue to approach each other, and it does not matter which truck is moving or if both are moving, the rate of increase in the signal strength at the detector will increase at a slower rate (see FIG. 5a, trend line 208 between 4 and 16 feet) than if the trucks were on the same path (See FIG. 5b, trend line 208 between 4 and 16 feet). There will be a range of travel distances (see FIG. 5a, travel distance between 16 and 20 feet) where the signal will stop increasing and begin to reduce. This response characteristic can be used by the PDS system to determine if the trucks are in an adjacent aisle rather than the same aisle. As will be explained below, the decision whether to stop or to ignore a truck in an adjacent aisle must be made before reaching the clips, i.e., the minimum points.

After passing the low point, or dip, the signal strength will rapidly increase, being maximum when the generating solenoid and the detector solenoid are parallel with each other (see FIG. 5b, distance traveled 44 feet). After passing the maximum, the signal will be a mirror image of the signal profile measured during the approach. In a typical industrial setting, such as a VNA metal rack system, where one truck is traveling down one aisle toward a second truck in an adjacent aisle, the signal will not be a smooth curve but will have variations and deviations from ideal due to the effects of the racks between the trucks and due to the steel in the trucks themselves. This will be addressed again later.

Once the PDS is able to determine that the trucks are approaching each other on the same path, or in the same VNA aisle, it is necessary to automatically stop the trucks before they collide. The decision to stop the moving truck, or both trucks if both are moving toward each other, must be made early enough to avoid a collision. Since the generating and detecting solenoids will be generally near the center of the vehicles rather than at front or back, a stop signal must be made early so that the bodies of the vehicles are stopped before they collide, rather than before the solenoids collide. In addition, after a signal is sent from the PDS to stop a truck, it will continue to coast some distance, depending upon its speed and the deceleration rate settings within the controller. Further, there is value in limiting the deceleration rate so as to not dump a load on the forks nor to induce excessive deceleration on the operator or to cause the wheels to slide which could allow the truck to turn and collide with the VNA racks.

The dip at which the magnetic field being sensed by the solenoid detector is minimum is too close to be able to stop the trucks, (see FIG. 5a, 28 feet traveled) in case the trucks are in the same aisle. So, the decision point must be earlier. This is accomplished by analyzing the shape of the curve produced by the detected signal. Once the signal is no longer increasing or has started to reduce, the decision is made immediately that the trucks are in adjacent aisles (see FIG. 5a, 4 to 20 feet distance traveled). Having decided the trucks are in adjacent aisles, the deciding truck will tag the other truck and ignore it so long as the two trucks remain in their current respective different aisles. However, if the signal continues to increase until the distance that they have closed has reached the designated last-chance decision point, the decision to stop the truck will be given. Since each truck will be equipped with a PDS system, they each will independently make a decision whether to stop or to ignore the other truck. If there are multiple trucks within the range of a truck, each truck will detect, communicate with each other truck, and independently make the appropriate decision regarding same aisle or adjacent aisle for each of the other trucks.

As mentioned earlier, the signals received by the detection solenoids in the PDS system on each lift truck will be affected by the metal rack system that is between the trucks and around the trucks. Also, the metal in the lift trucks will have some effect on the signals. The effects of the fluctuations from these interferences are minimized by use of trend analyses techniques so that the decisions can be accurately made at sufficiently large separation distances to avoid collisions and to avoid nuisances to operators on trucks in adjacent aisles. (i.e., FIG. 5b, between 13 and 18 feet). The slope trend may be calculated using field strength data over a range of travel distances. The distance range may depend on the aisle spacing and the configuration of the metal rack structure, including the upright members. For example, in one rack system having parallel aisles between metal racks, with the aisle centerlines spaced at about 14 feet, and with rack structural uprights members spaced at about 8 feet, about 11 feet for the trend travel distance range was found useful. And, for some aisle systems, the trend travel distance range may generally be greater than the metal upright separation. The trend travel distance ranges may be determined and adjusted individually by testing for various configurations and environments of the metal rack structures.

Making the decision whether a lift truck is in the same aisle or an adjacent aisle requires evaluation of the X-axis vector by the detector solenoid. To do so, the magnitude of the detected signal must be referenced to the distance between the generating solenoid on one truck and the detector solenoid on the other truck. To accomplish this, the orientation of each truck, whether oriented up the aisle or down the aisle, is determined by a digital compass on each PDS. Also, the direction and rate of rotation of the truck wheels is used in combination with the compass information to measure the direction of travel and the distance of travel after entry into the magnetic field of the other truck. This information is exchanged between trucks, via UHF data packs, so that each one makes its own autonomous decision whether to stop or to ignore the truck. The actual frequency of the data transmissions can be chosen for the specific industrial application.

Trucks in VNA aisles can be automatically slowed down at the time that one truck enters the field of another truck or can be slowing down at some point beyond first entry into the magnetic field. Choosing this option depends upon the speeds that the trucks are allow to operate, operating conditions, loads being carried, etc.

The various embodiments described herein are provided by way of illustration only and should not be construed to limit the claims attached hereto. Those skilled in the art will readily recognize various modifications and changes that may be made without following the example embodiments and applications illustrated and described herein, and without departing from the scope of the following claims.

The above case descriptions are only exemplary and illustrative uses and combinations of utilizing magnetic vectors for increased safety. Not all determinations must be made, and the determinations may be made in differing orders and in different combinations. In addition, each of the determinations, thresholds, instructions, and the like may incorporated into the storage or memory of an MFG, MFD, or respective vehicle and executed by each respective processor/controller.

The above description and drawings are only illustrative of preferred embodiments and are not intended to be limiting. Accordingly, the inventions are not considered as being limited by the foregoing description and drawings, but are intended to embrace all such alternatives, modifications, substitutes, and variances. For example, much of the above description has focused on a particular use case scenario of two or more fork trucks. However, the disclosure is equally applicable to any mobile or immobile hazardous location within a worksite. Hazardous locations include vehicles, hand trucks, pedestrians, holes in the ground, hazardous fueling stations, sensitive or costly equipment, high traffic regions, any other location worth protecting or prudent to establish protections from, or the like. The disclosure is also equally applicable to where vector components are determined between an MFG at a hazardous location and personal alarm device (PAD), as described in the Frederick patents. Any subject matter or modification thereof which comes within the spirit and scope of the disclosure is to be considered part of the present invention.

What is claimed as new and desired to be protected by Letters Patent is:

1. A proximity detection system, comprising:
at least one magnetic field generator associated with a first location configured to generate at least one magnetic field; and
at least one magnetic field detector associated with a second location, the at least one magnetic field detector having at least two detection axes,
wherein the at least two detection axes are oriented at angles from each other; and
wherein the at least one magnetic field detector is configured to determine a strength of the at least one magnetic field in each of a first vector component corresponding to a first of the at least two detection axes and a second vector component corresponding to a second of the at least two detection axes, and to generate a signal based on a first rate of change of the strength of the at least one magnetic field in the first vector component and based on a second rate of change of the at least one magnetic field in the second vector component to indicate a proximity of the first location and the second location with respect to each other.

2. The proximity detection system of claim 1, where the first location is one of a vehicle, a stationary location, and a person.

3. The proximity detection system of claim 1, wherein the second location is one of a vehicle, a person, and a stationary location.

4. The proximity detection system of claim 2, wherein the second location is the stationary location.

5. The proximity detection system of claim 1, wherein the at least two detection axes are orthogonal.

6. The proximity detection system of claim 1, wherein the magnetic field detector is further configured to determine a relative strength of one of the first vector component or the second vector component to a composite of the first vector component and the second vector component.

7. The proximity detection system of claim 1, wherein the magnetic field generator and/or magnetic field detector includes a direction providing system and wherein the signal is also based on an output of the direction providing system.

8. The proximity detection system of claim 7, wherein the first location is a first vehicle and the second location is a second vehicle, wherein the first vehicle has another magnetic field detector and the second vehicle has another magnetic field generator (MFG), wherein each of the first vehicle and the second vehicle generates a compass direction, and wherein the signal is generated also based on the compass direction of the second vehicle.

9. The proximity detection system of claim 8, wherein the signal is not generated unless the first vehicle and the second vehicle are approaching each other.

10. The proximity detection system of claim 6, wherein the magnetic field detector is further configured to determine a relative strength of the first vector component and the second vector component at a field strength threshold.

11. A proximity detection system, comprising:
at least one magnetic field generator associated with a first location configured to generate at least one magnetic field; and
at least one magnetic field detector associated with a second location, the at least one magnetic field detector having at least two detection axes,
wherein the at least two detection axes are oriented at angles from each other; and
wherein the at least one magnetic field detector is configured to:
(a) determine a strength of the at least one magnetic field in each of a first vector component corresponding to a first of the at least two detection axes and a second vector component corresponding to a second of the at least two detection axes, to determine a relative strength of each of the first vector component and the second vector component to a composite of the first vector component and the second vector component; and
(b) generate a signal based on a first rate of change of the relative strength of the first vector component to the composite of the first vector component and the second vector component and a second rate of change of the relative strength of the second vector component to the composite of the first vector component and the second vector component to indicate a proximity of the first location and the second location with respect to each other.

12. The proximity detection system of claim 7, wherein the direction providing system is one or more of a magnetic compass, a solid state compass, a buried wire system, a global positioning system (GPS) receiver, a gyrocompass and/or an accelerometer.

13. The proximity detection system of claim 8, wherein the first vehicle is adapted to transmit the compass direction of the first vehicle to the second vehicle and wherein the signal is generated also based on a comparison between the compass direction of the first vehicle and the compass direction of the second vehicle.

14. A method of proximity detection, the method comprising the steps of:

generating at least one magnetic field associated with a first location;

determining a strength of the at least one magnetic field at a second location in each of a first vector component corresponding to a first detection axis of a magnetic field detector and a second vector component corresponding to a second detection axis of the magnetic field detector, wherein the first detection axis and the second detection axis are oriented at angles from each other; and generating a signal based on a first rate of change of the strength of the at least one magnetic field in the first vector component and based on a second rate of change of the at least one magnetic field in the second vector component to indicate a proximity of the first location and the second location with respect to each other.

15. The method of proximity detection of claim 14, wherein the first location is one of a vehicle, a stationary location, and a person;

wherein the second location is one of another vehicle, another person, and a another stationary location;

wherein the first axis and second axis are orthogonal;

and further comprising the steps of:

determining a relative strength of one of the first vector component or the second vector component to a composite of the first vector component and the second vector component; and generating the signal based also on an output of a direction providing system.

16. The method of proximity detection of claim 15, wherein the first location is a first vehicle and the second location is a second vehicle.

17. The method of proximity detection of claim 16, wherein the signal is not generated unless the first vehicle and the second vehicle are approaching each other.

18. The method of proximity detection of claim 16, wherein the direction providing system is at least one of a magnetic compass, a solid state compass, a buried wire system, a global positioning system (GPS) receiver, a gyro-compass and/or an accelerometer.

19. The method of proximity detection of claim 18, further comprising transmitting, by the first vehicle, a compass heading of the first vehicle to the second vehicle and generating the signal based also on a comparison between the output of the direction providing system and the compass heading.

20. A proximity detection system, comprising:

at least one magnetic field generator associated with a first location configured to generate at least one magnetic field; and at least one magnetic field detector associated with a second location, the at least one magnetic field detector having at least two detection axes, wherein the at least two detection axes are oriented at angles from each other;

wherein the at least one magnetic field detector is configured to determine a strength of the at least one magnetic field in each of a first vector component corresponding to a first of the at least two detection axes and a second vector component corresponding to a second of the at least two detection axes, to determine a relative strength of each of the first vector component and the second vector component to a composite of the first vector component and the second vector component, and to generate a signal based on a first rate of change of the relative strength of the first vector component to the composite of the first vector component and the second vector component and a second rate of change of the relative strength of the second vector component to the composite of the first vector component and the second vector component to indicate a proximity of the first location and the second location with respect to each other; and wherein the at least one magnetic field generator and/or the at least one magnetic field detector includes a direction providing system and the at least one magnetic field detector is configured to generate the signal based also on a direction output of the direction providing system.

* * * * *